United States Patent [19]
Lolkema

[11] 3,894,384
[45] July 15, 1975

[54] PICKING MACHINE

[75] Inventor: Lolke Lolkema, Delfzijl, Netherlands

[73] Assignee: Ter Borg & Mensinga's Machinenfabriek N.V., Appingedam, Netherlands

[22] Filed: June 20, 1974

[21] Appl. No.: 481,189

[52] U.S. Cl. .................................. 56/130; 56/35
[51] Int. Cl. .................................. A01d 45/22
[58] Field of Search ............... 56/126–130, 56/330, 33–35, 116, 13.5, 15.8, 15.9, 16.1

[56] References Cited
UNITED STATES PATENTS
1,429,168  9/1922  Scott .................................. 56/130
1,842,737  1/1932  Tharp .................................. 56/128

Primary Examiner—Hugh R. Chamblee
Assistant Examiner—J. N. Eskovitz
Attorney, Agent, or Firm—Lilling & Siegel

[57] ABSTRACT

Machine for picking low growing crops, such as beans. The machine is of the lateral or multi-row type with a picking drum axis transverse to the rows of plants to be picked. A plurality of picking drums, each of a width apt for picking one row, each pivotable around a horizontal axis in the machine frame, and each having its own rear wheel, having flexible joint among each other and a common drive. Adjustability of the spacing between the center lines of the units may be provided for.

7 Claims, 2 Drawing Figures

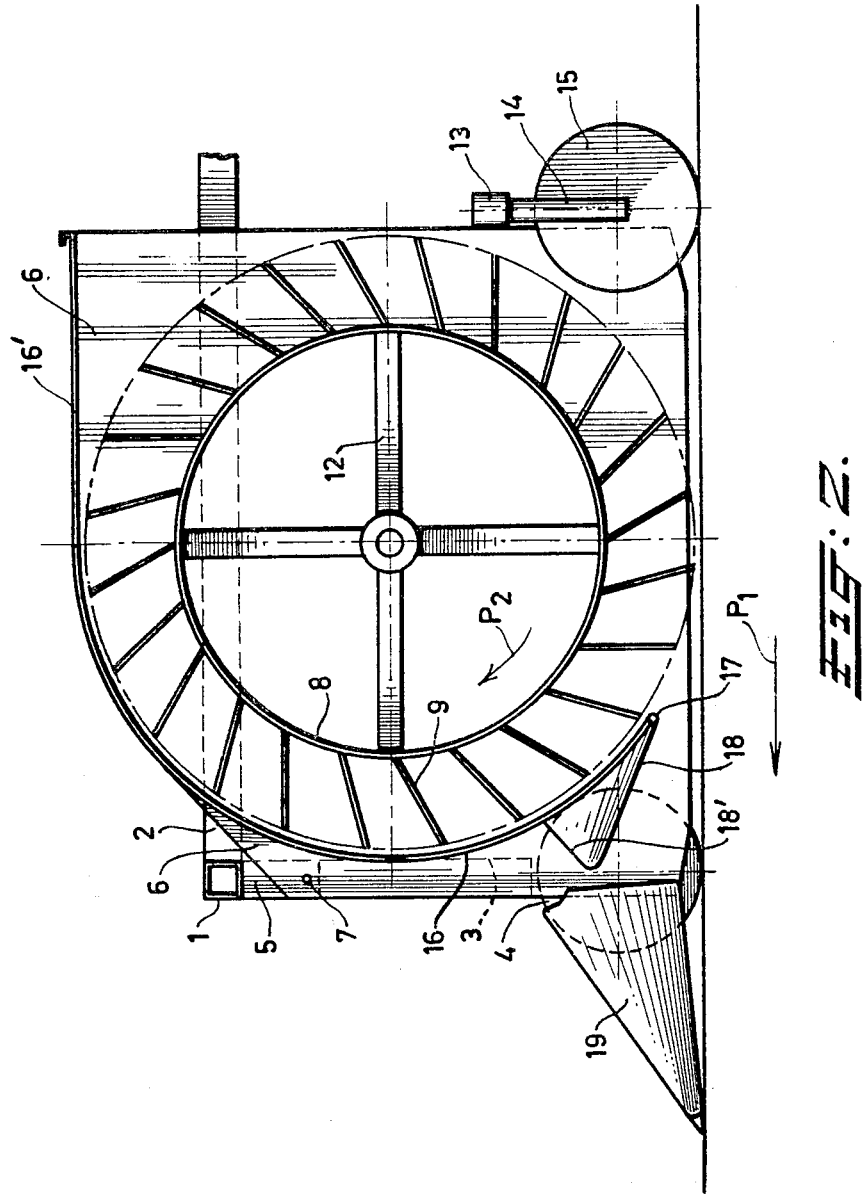

PICKING MACHINE

BACKGROUND OF THE INVENTION

The invention relates to a machine for harvesting low growing crops, such as beans, said machine comprising a drum provided with a plurality of picking fingers, said drum having an axis transverse to the direction of travel, and being rotable in a sense opposite the sense of rotation wheels, said drum cooperating with the lower edge, substantially at picking height, of a picking plate extending in curved shape at least at the front side partially around the drum.

Multi-row picking or harvesting machines are known in the art already. The type is different from the picking machines acting upon one or two rows by means of one or two picking drums having an axis parallel to the direction of travel of the machine, each drum picking no more than one row of the crop. The multi-row or lateral harvester is adapted to simultaneously act upon a plurality of rows of plants beside each other.

There is, however, a disadvantage in this type in case the machine has to work on land which is not reasonably flat. It is known in the art already to adjust the height of the picking drum with respect to the ground, for example by making the various wheels adjustable in vertical direction. In the end, however, the effective operating height of the drum at each moment is determined by the average height of the wheels. When one of the wheels has to pass a local rise in the field this implies anyhow that part of the length of the drum will operate insufficiently close to the ground; when one of the wheels goes through a pit some of the picking fingers will reach the soil, giving always rise the crop becoming dirty, but sometimes this may also cause damage to the crop to be harvested. Local differences in the level of the land are especially caused by the fact that it is usual to earth the rows of plants up.

One object of the invention is to provide a picking machine of the multi-row or lateral type which is less sensible to unevennesses in the ground level.

Another object is to provide a picking machine of the afore mentioned type which is divided into a plurality of units having independent level adapting characteristics.

SUMMARY OF THE INVENTION

In the harvesting machine according to this invention the picking drum is divided into a plurality of units, each adapted to pick one row of plants, and each drum unit having its own frame being pivotable at the front about a horizontal axis in the machine frame, said machine frame being provided with front wheels and the frame of each of the units being provided at the rear with a travelling wheel arranged centrally with respect to the unit, the drum units being mutually connected by means of flexible joints and being jointly driven.

Because of the central arrangement of the rear traveling wheel on each of the units this wheel will travel centrally on the already picked row of plants. Each unit is able to follow the local height level of the land independent of all other units.

Preferably in the machine the frame of each of the units is provided at either side with a forwardly directed torpedo shaped guide member. In front of and by these guide members the plants in each row, even when grown out widely or when fallen over by rain or wind, will be erected and brought in front of the picking drum unit over the full height and width.

A further favorable feature of the machine of this invention is the adjustability of the mounting means for the frames of the various units in the direction parallel to the axis of the drum units, this adjustability being provided with respect to the frame of the overall machine, and the couplings between the drum units being also adjustable. In this way a very simple adaptability is obtained in connection with the fact that for various sorts of soil, the farmer will choose a different row spacing when sowing.

SURVEY OF THE DRAWINGS

The machine according to the invention will hereinafter be described in detail with respect to the accompanying drawings of one embodiment. In the drawing:

FIG. 2 is a sectional view in elevation through one of the units, the section being taken perpendicular to the drum axis.

DESCRIPTION OF THE PREFERRED EMBODIMENT

Figure 1:
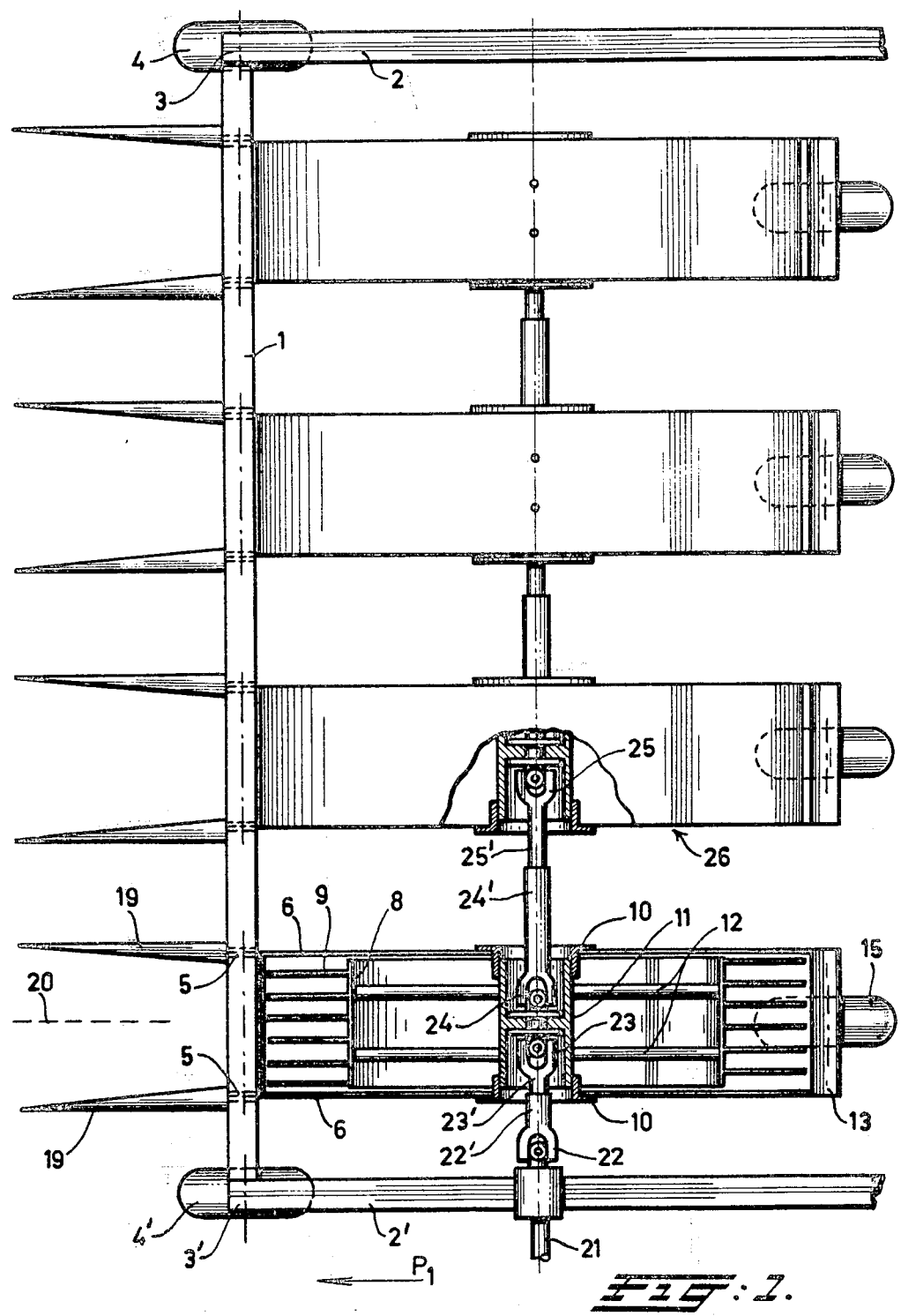
FIG. 1 is a horizontal view of the picking machine through the common axis of the various picking units.

The picking machine comprises a main frame which includes a front beam 1 and two side beams 2, 2'. Of these side beams only the front portion is shown in the drawing; the rear portion of each of the side beams 2, 2' is entirely conventional in this art, as is the further machine at the rear end with a view to treatment of the crop harvested, for which reason these portions are not shown nor described.

The main frame further includes front vertical posts 3, 3', welded with their topends to the front ends, respectively, of the beams 2, 2' which in turn are welded to the ends of the front beam 1. The lower ends of the vertical posts 3, 3' support front wheels 4 and 4', respectively. These front wheels are vertically adjustable, in a manner which may be entirely equal to what is usual in this art, for which reason details have not been shown. The vertical adjustability of the front wheels serves the adjustment of the desired height of the machine frame as a whole with respect to the ground.

The horizontal beam 1 of the main frame of the machine is provided with a plurality of pairs of mounting means 5 for mounting the drum units.

The frame of each of the drum units is constituted by a pair of side plates 6, pivotable about pivot pins 7 mounted in the mounting plates 5; each set of plates 6 is therefore tiltable in a vertical plane. Between the vertical side plates a picking drum unit 8 is arranged, being provided, in usual manner, with a plurality of picking fingers 9 around its circumference. For this arrangement each of the side plates 6 is provided with a bushing 10 constituting a bearing for a hub 11 which supports the drum 8 by means of a set of spokes 12.

At the rear between plates 6 of each of the units a small transverse beam 13 is provided, supporting a fork 14 for a rear wheel 15. Also this rear wheel 15 of each of the units is vertically adjustable so as to be able, after adjusting the operative height of the machine frame as a whole by adjustment of the front wheels 4, to adjust the operative height of the picking drum in each unit independent of the others. The manner in which the rear wheel 15 is made adjustable with respect to beam 13 can be chosen in conformity with known principles for this purpose.

Also between the side plates 6 of each picking unit is a picking plate 16. This is a cylindrically curved plate having a radius which is somewhat bigger than the radius of the ends of the picking fingers 9 with respect to the axis of the drum 8, and surrounding the greater part of the front half of the circumference of the picking drum in the direction of the travel $P_1$ of the machine. The curved plate portion is extended at the top by a horizontal portion 16' which, further to the rear, merges into the known means for treating the beans or other picked material. At the other end the picking plate 16 ends in a picking edge 17 which defines the picking level of the machine with respect to the ground. Starting from this picking edge there is a stiffening plate 18 in front of and below the lower area of the plate 16; this stiffening plate 18 further has a bent portion 18' which is welded again against the plate 16.

Against each side of the side plates 6 of the picking unit a torpedo shaped guiding member 19 is affixed. This guiding member or guiding body, which may be manufactured in curved plate material, has its point or extremity directed forwardly, having a height which gradually increases further to the rear. The details of this shape of this guiding body in fact do not matter very much; they are known in the art in various shapes with the role of lifting up all portions of the plants which have grown out in lateral direction or which have for some reason fallen over while standing with their base in the row indicated by 20 in FIG. 1. Such torpedo shaped bodies 19 are, in accordance with the invention, affixed to each of the units individually. When the machine as a whole travels in the direction indicated by the arrow $P_1$ the guiding bodies 19 collect the plants within the width of the picking unit in question between the plates 6. Subsequently the machine, with the oblique portion 18 of the stiffening means, travels over the plants, whereupon, by cooperation between the picking edge 17 and the picking fingers 9 on the drum 8 which rotates in the direction $P_2$, the foliage and the fruits together will be picked and will be taken along against the inner face of the picking plate 16 upwardly and rearwardly to be discharged for further treatment.

In FIG. 1 it is visible that the embodiment of the machine shown in the drawings comprises four of such picking units. The first or the last unit in the machine can be driven for rotary motion in a manner which is known per se, by means of an axle 21 which can be coupled with driving means in form of a tractor, not represented. The axle 21 is coupled with the hub 11 of the first unit by means of a universal joint 22, 22', 23', 23. It will therefore be clear that, by applying these universal joints 22, 23, the drum unit, while being driven, is able to move in a vertical plane by pivoting about the pin 7 with respect to the machine frame when the rear wheel 15 of this unit follows irregularities in the transverse contour of the ground. In similar manner a universal joint 24, 24', 25', 25 is provided between the hub 11 of the first unit and the hub of the following unit in the group, so that also the second unit, indicated as a whole by 26, will simultaneously be driven etc. In this way there is a common drive for all units, nevertheless each of the units being able to move vertically and independent of the adjacent unit in order to follow the course of the ground at the location of each row of plants.

With regard to the fact that sowing is usually done with values of the row spacing which may be chosen independent on the sort of plants and independent on the quality of the soil, the manufacturer will be able to make picking machines available where the spacing between central planes of the picking units has the value desired by each individual customer. It is easy, however, to provide an adjustment feature for the mounting means 5 by which the tiltable picking units are affixed to the machine frame. One may use for the horizontal beam 1 of the machine frame tube material having a non-circular profile, such as the square tube, shown in FIG. 2. It is possible to weld the mounting plate 5 to pieces of similar profile, in the present case square, but of somewhat greater dimension, movable lengthwise with respect to beam 1. As a matter of course means should be provided to fasten these tube pieces carrying the plates 5 with respect to beam 1 after having chosen the correct distance of the picking units with respect to each other, but such means will be very simple; they may for example have the form of bolts. Each individual user of the machine will thereby obtain the possibility of adjusting at any moment the spacing between the various units as desired for the piece of land to be worked upon. Details of this adjustability feature have not been represented in the drawing as the man skilled in this art will clearly understand what is meant. What is in fact represented is the also necessary adjustability of the driving means. In FIG. 1 it is visible that the universal joint comprises a torque tube 22', 24' and cooperating shafts 23' and 25', respectively. In case the tube and shaft 22', 23' and 24', 25', respectively, have a cross-sectional profile which is non-circular or when their mutual coupling is done by means which allow for a relative longitudinal displacement, such as by a key and key bed, the shaft drive transmission will of itself find the correct length which belongs to the arrangement of each drum unit with respect to the machine frame.

What we claim is:

1. A machine for harvesting low growing crops, such as beans, said machine comprising a main frame provided with front wheels and in which are mounted a plurality of units, each having a width adapted to pick one row of plants, and each unit having its own frame being pivotable at the front about a horizontal axis in the main frame and a drum provided with a plurality of picking fingers, said drum having an axis transverse to the direction of travel of the machine and being rotatable in a sense opposite the sense of rotation of the machine wheels, said drum cooperating with the lower edge, substantially at the intended picking height, of a picking plate extending in curved shape at least at the front side partially around the drum, the frame of each of the units being provided at the rear with a traveling wheel arranged centrally with respect to the unit, the drums in the units being mutually connected by means of flexible joints and being provided with a common drive axle.

2. Machine as in claim 1, wherein the frame of each unit is provided at either side with a forwardly directed torpedo shaped guide body.

3. Machine as in claim 1, wherein means for mounting the frame of each of the units are adjustable in lateral direction of the machine, parallel to the axial direction of the drums, said adjustability being made with respect to the machine main frame, the joints between the drum units being also mutually adjustable.

4. Machine as in claim 1, wherein the flexible joints between the central drive and the first unit, and between the units among each other, comprise universal joints.

5. Machine as in claim 1, wherein means for mounting the frame, and wherein the flexible joints between the central drive and the first unit, and between the units among each other, comprise universal joints, which are lengthwise adjustable.

6. Machine as in claim 1, wherein the frame of each of the units comprises a pair of vertical side plates in which the drum is rotatably mounted.

7. Machine as in claim 1, wherein the rear traveling wheel of each of the units is adjustable in vertical direction.

* * * * *